United States Patent Office

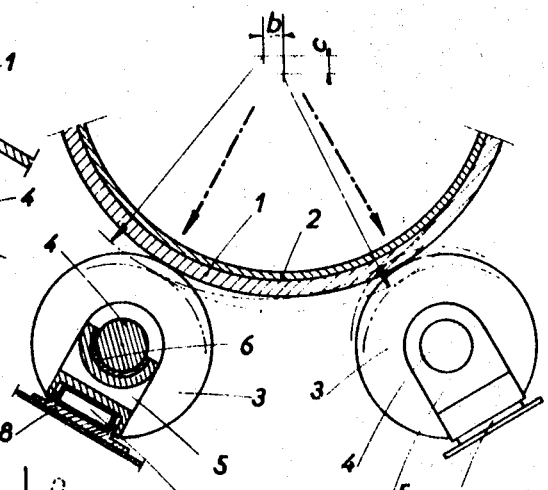
Fig. 1
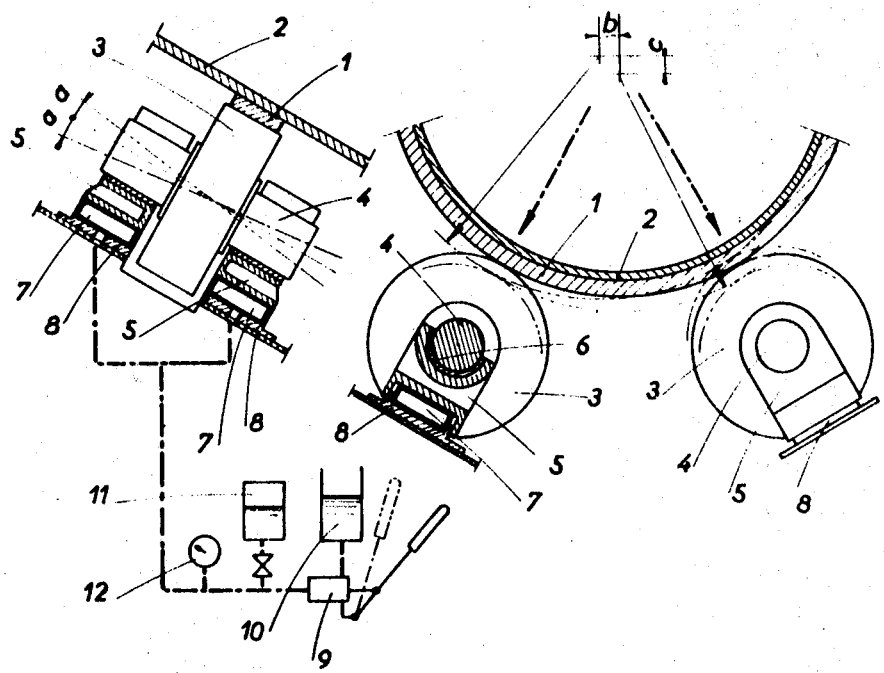
Fig. 2
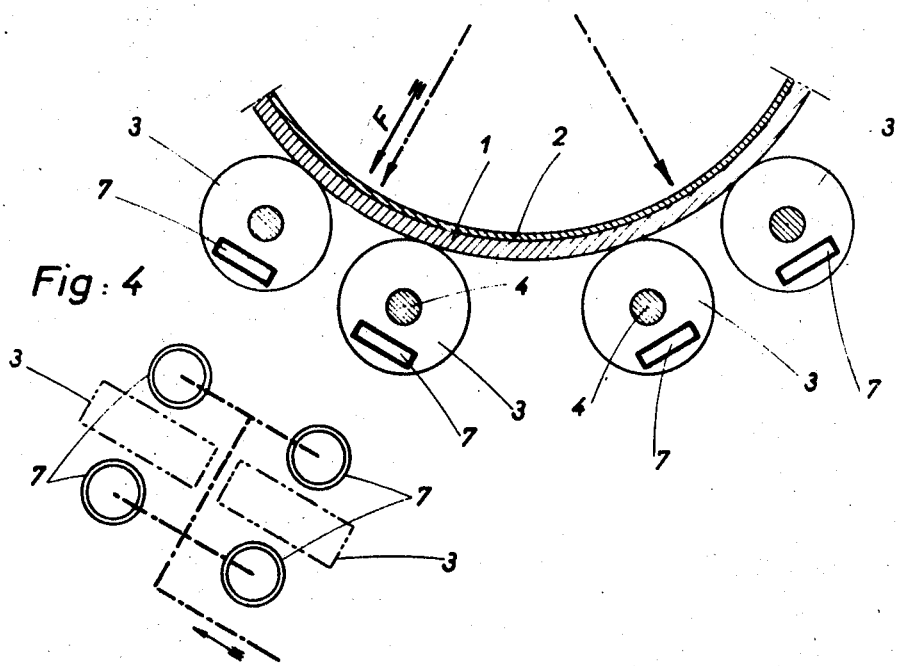
Fig. 3
Fig. 4

3,517,915
Patented June 30, 1970

3,517,915
SELF-ALIGNING CARRYING ROLLERS FOR HEAVY ROTARY BODIES, SUCH AS ROTARY KILNS
René Bovagne and Gérard Deynat, Chalon-sur-Saone, France, assignors to Societe des Forges et Ateliers du Creusot, Paris, France, a company of France
Filed Aug. 6, 1968, Ser. No. 750,646
Claims priority, application France, Dec. 7, 1967, 131,312
Int. Cl. F27b 7/00
U.S. Cl. 263—33
3 Claims

ABSTRACT OF THE DISCLOSURE

This invention provides a rotary body, a hoop of which rests on two rollers, each supported on two bearings each carried by a deformable volume of liquid fed from a common source.

---

The invention relates to self-aligning carrying rollers for heavy rotary bodies, such as rotary kilns, having a plurality of bearing hoops on carrying rollers disposed symmetrically on either side of the vertical plane extending through the axis of the rotary body.

Clearly, a hoop bears correctly against each of the rollers, in accordance with a common generatrix, only if the kiln axis and the roller axis remain parallel with one another. However, rotary kilns of large radial and axial dimensions, such as cement works kilns, are required to stand up to temporary deformations to a varying extent localised, such as heat deformations of the collars, and permanent deformation, such as sagging and varying amounts of disalignment in relation to the theoretical axis of the kiln; lastly, the bearings of the roller shafts may become disaligned, for instance as a result of the collapse of the solid element supporting the bearings.

Consequently, the hoops bear inaccurately against the rollers, resulting in localised contact pressures which may exceed the limits permitted by even a high quality metal, thus causing rapid deterioration of the bearing surfaces. Moreover, loading faults and disequilibrium in the bearing of the hoop against the rollers causes the hoop and carrying collar to become more than normally oval, thus endangering the cohesion of the kin brickwork.

The invention relates to self-aligning carrying rollers enabling load disequilibria to be eliminated from all the bearings of the kiln hoops against carrying rollers.

According to the invention the shaft of each of the carrying rollers of the hoop is supported by two bearings, each of which bears against the deformable volume of pressurised liquid, the two volumes being fed from a common liquid source at regulatable pressure.

According to another main feature of the invention, a common pressurised liquid source feeds the deformable capacities against which the bearings of carrying rollers bear which are disposed on the same side of the rotary body and each support one of two adjacent collars.

Exemplary embodiments of the invention will now be described in greater detail with reference to the accompanying drawings, which are diagrammatic to a varying extent, and wherein:

FIG. 1 shows in partial cross-section the bearing of a kiln hoop against two carrying rollers;

FIG. 2 is a section taken along the line II—II in FIG. 1;

FIG. 3 is a view similar to FIG. 1, showing a hoop bearing against four carrying rollers;

FIG. 4 is a view taken in the direction of the arrow F in FIG. 3;

Figure 5:
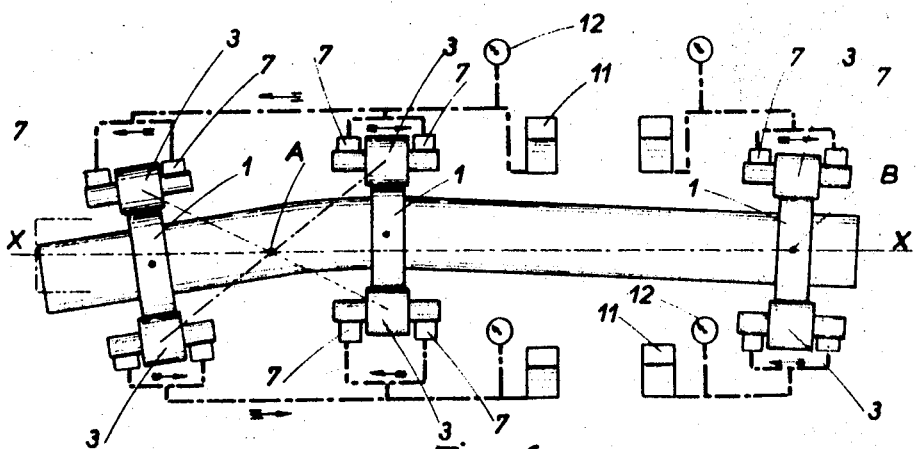
FIG. 5 is a diagrammatic view showing a kiln having three bearing hoops, the disalignment of which is shown greatly exaggerated.

FIG. 1 shows a kiln hoop 1 mounted on a carrying collar 2 and bearing against two rollers 3 disposed symmetrically of the axis of the kiln; each of the shafts 4 of the rollers 3 is supported by two bearings 5 having linings or semi-linings 6 and bearing via hydraulic cushions 7 against bed plates 8 for attachment to the solid supporting structures.

FIG. 2 shows how the two hydraulic cushions 7 are fed from a common pressurised liquid circuit comprising a pump 9, a liquid reservoir 10, a pneumatic oil accumulator 11, which can be insulated, and a manometer 12. FIG. 2 shows the angles $a$ of movement of the shaft 4 in relation to its theoretical position corresponding to the satisfactory alignment of the kiln in the zone of the hoop 1.

Clearly, any difference in parallelism between the kiln axis and the shaft of the roller will cause liquid to be transferred from one of the chambers 7 to the other, whatever the plane may be in which the difference in parallelism tends to occur; contact between the hoop 1 and each of the rollers 3 will therefore be able to be established along a common generatrix, or at least in the immediate vicinity thereof. The pressures on the bushes of the two bearings remain equal.

The inclinations $a$ may have superimposed on them disalignments of the kiln having a value $b$ and $c$ (FIG. 1) in relation to the rollers in the zone of the hoop. Whatever the direction of these disalignments may be, a reading of the manometer 12 associated with the two conjugate rollers enables the load to be distributed to the two rollers.

After prolonged stoppage of the kiln, causing deformation to the casing thereof or to a hoop, the two manometers 12 and the two pumps 9 can always be used for re-establishing the distribution of the loads. Any temporary or permanent ovalisation will be absorbed without considerable variation in the loads by the accumulators 11.

The equal distribution of the load to the two opposite rollers, and also the contact between the hoop and the rollers along common generatrices enable the contact pressures to be satisfactorily distributed over the whole width of the bearing strip, for the same total load, and consequently enable the actual specific contact pressures to be reduced.

For very large kilns, or kilns with very heavy loads, each hoop can bear against four rollers disposed in pairs on either side of the kiln, as shown in FIG. 3. The four bearings of each pair of rollers 3 then bear against four hydraulic cushions 7 which are connected to a common pressurised liquid source (FIG. 4).

FIG. 5 shows a kiln having three bearing hoops 1, the deformation of the kiln in relation to a theoretical axis X—X being shown in an exaggerated manner. In this case the bearings of the two hoops 1 in the kiln zone subjected to the heaviest deformations, more particularly the firing zone, are conjugate with one another, the four hydraulic cushions 7 of the carrying rollers 3 disposed on the same side of the kiln being connected to a common pressurised fluid source. In that case it may be considered that the kiln behaves as if it were bearing against the two rollers disposed on either side of a fictive support A; the kiln assembly thus rests on the two supports A, B, and in these conditions overloading on one or the other of the three hoops and its carrying rollers is practically eliminated.

Figure 6:
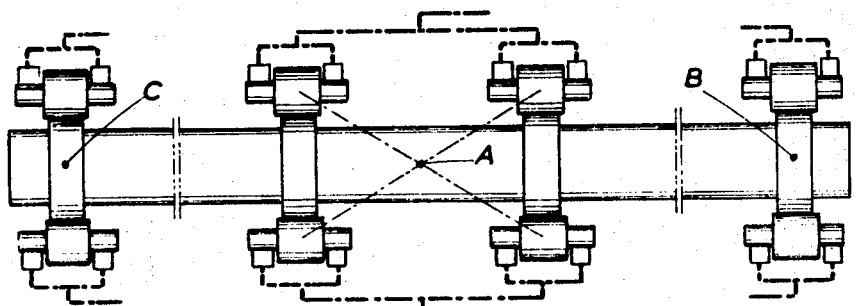
FIG. 6 is a diagrammatic view showing a kiln having four bearing hoops.

In the case of a kiln having four hoops (FIG. 6), the bearings of the two central hoops can be made conjugate with one another; the kiln assembly thus rests on three supports A–C whose fictive support A can be considered to be a resilient support if the feed circuits of the hydraulic cushion 7 of the two conjugate supports comprise pneumatic oil accumulators.

Lastly, in the case of kilns having more than four hoops, it will always be possible to make the bearings of two adjacent hoops conjugate with one another, in each of the zones in which the expected deformations will be heaviest.

Whatever the number of hoops provided may be, measurement of the pressures in hydraulic cushions enables a substantially uniform distribution of the total load over all the bearing places to be set up and maintained even in operation.

Figure 7:
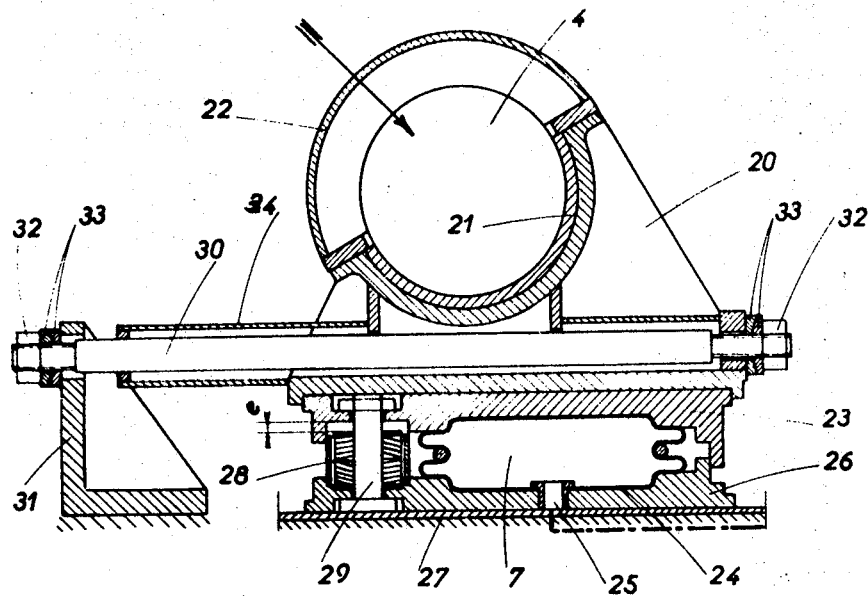
FIG. 7 is a view, to an enlarged scale, showing in cross-section a particular embodiment of the bearing which bears against the deformable volume.

FIG. 7 shows to a larger scale an embodiment of a hydraulic cushion bearing for a carrying roller.

The bearing is formed by a frame 20 having a semi-bush 21 supporting the shaft 4 of a roller, the bearing also having a hood 22. The frame 20 is unitary with a plate 23 bearing against the deformable envelope 24 of a hydraulic cushion 7 connected at a place 25 to the pressurised liquid source, the envelope 24 being supported by a bed plate 26 resting via a plastics bearing joint 27 on a concrete support or a frame. Inserted between the plate 23 and the bed plate 26 are resilient elements (only one is shown), each of which is formed by a stack of Belleville washers 28 centred on an assembly bolt 29 for the plate 23 and the bed plate 26. These resilient methods are adapted to stand up to at least a fraction of the load in the case of a collapse of the hydraulic cushion 7 of value $e$, while enabling the self-alignment of the roller to be maintained.

In the angular gaps between the resilient elements, the plate 23 is centred with a slight clearance on the bed plate 26. The frame 20 is connected via at least one bar 30 to a fixed bracket 31; the bar 30, which is adapted to absorb the horizontal component of the load resting on the bearing has at each of its ends a screwthreading carrying a nut 32 bearing against two washers 39 with spherical contact surfaces. A tubular strut 34 unitary with the frame 20 and bearing against the bar 30 adjacent the bracket 31 limits weak rotary movements of the bearing around the vertical axis.

The cushion 27 of each of the two bearings of a carrying roller allows slight movements of inclination of a bearing in both directions caused by the orientation of the roller shaft in contact with the kiln.

Of course, the invention is not limited to the arrangements and embodiments disclosed hereinbefore, which could be modified or completed by any useful accessory member without exceeding the scope of the invention.

For instance, inter alia the hydraulic bearing cushions for the bearings might be replaced by hydraulic jacks, or some other deformable volume, and the roller shafts, instead of being journalled in the bearings, could be formed by fixed shafts mounted in supports bearing against the deformable volumes, on which the rollers would be centred, for instance, by roller bearings.

What is claimed is:

1. Self-aligning carrying rollers for heavy rotary bodies, such as rotary kilns, having a plurality of bearing hoops supported on carrying rollers disposed symmetrically on either side of the vertical plane extending through the axis of the rotary body and a shaft for each of the rollers, the shaft of each of the carrying rollers of one hoop being supported by a bearing at each extremity thereof, each bearing being supported by a deformable volume of pressurised liquid, the two volumes being fed from a common liquid circuit at regulatable pressure.

2. Carrying rollers as set forth in claim 1, including a common liquid circuit of regulatable pressure feeding the deformable volumes against which the bearings of carrying rollers bear which are disposed on the same side of the rotary body and each support one of two adjacent hoops.

3. Carrying rollers as set forth in claim 1, each of the common circuits feeding the deformable volumes against which the bearings of the carrying rollers bear, including a manometer for reading the load supported by the rollers.

References Cited

UNITED STATES PATENTS

| | | | |
|---|---|---|---|
| 1,184,174 | 5/1916 | Gilbert | 263—33 |
| 3,169,755 | 2/1965 | Eklund et al. | 263—33 |
| 3,436,062 | 4/1969 | Raevsky | 263—33 |

JOHN J. CAMBY, Primary Examiner